July 5, 1927.  
J. KALAF, JR  
FRICTION CLUTCH  
Filed Oct. 16, 1923  
1,635,086  
3 Sheets-Sheet 3
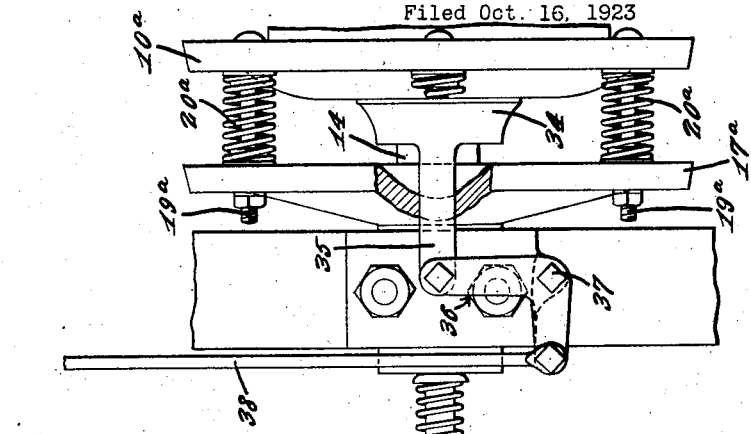
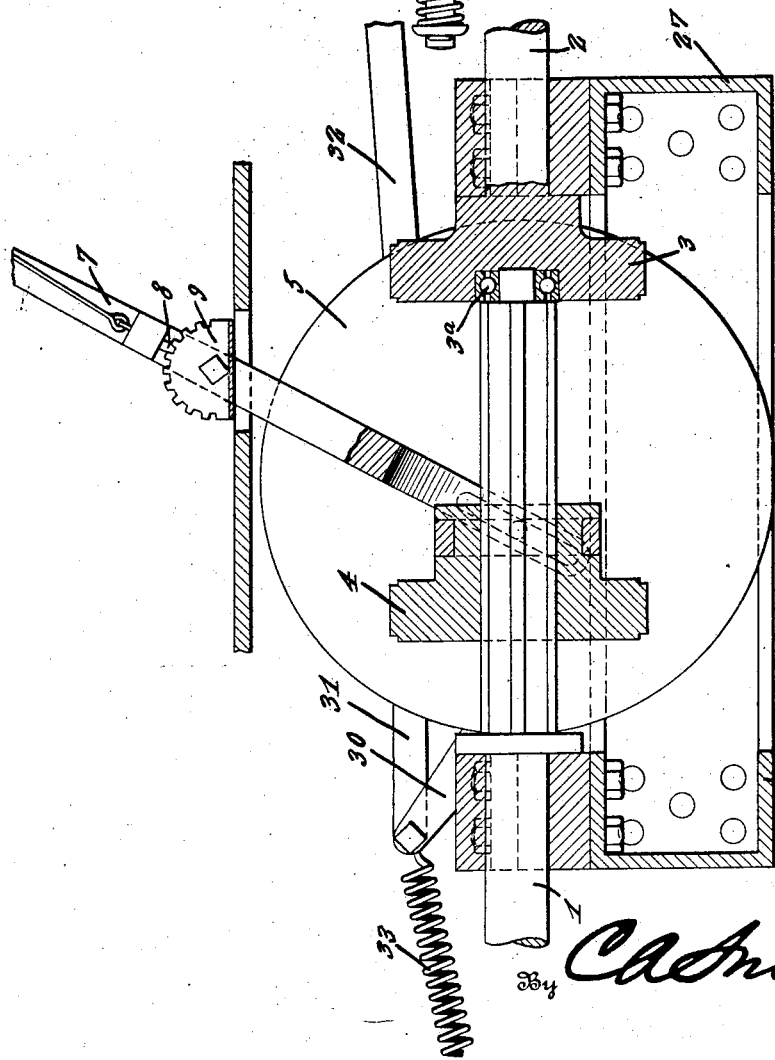
Inventor  
J. Kalaf Jr.  
By C. A. Snow & Co.  
Attorneys Patented July 5, 1927.

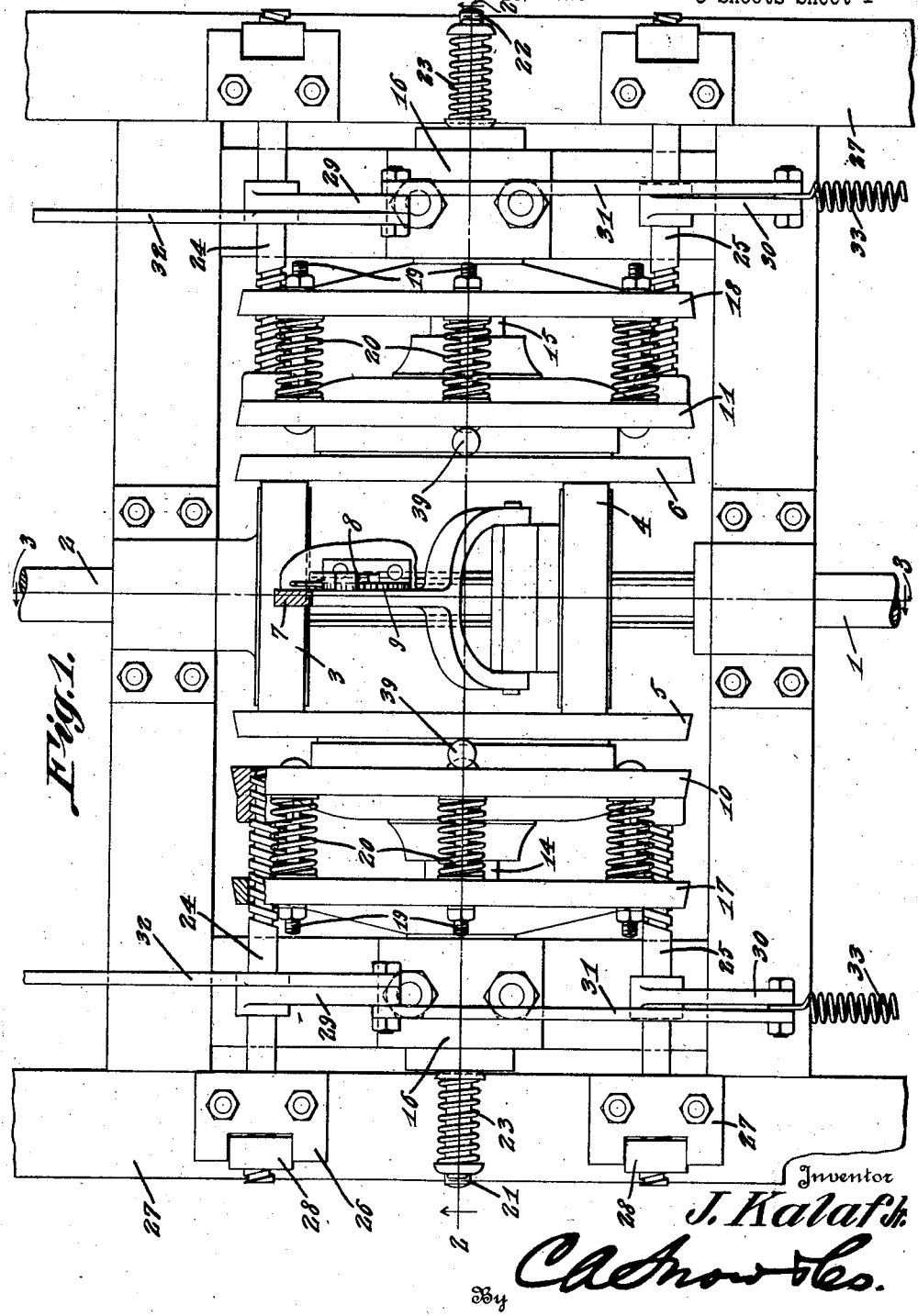

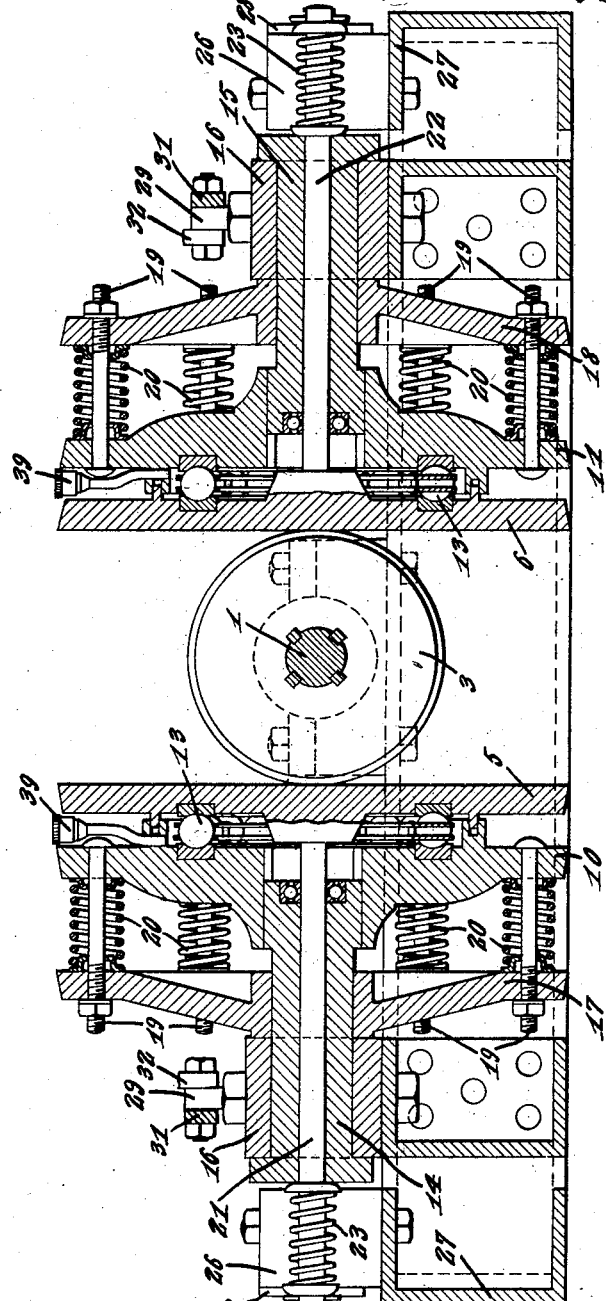

1,635,086

UNITED STATES PATENT OFFICE.

JOHN KALAF, JR., OF META, MISSOURI.

FRICTION CLUTCH.

Application filed October 16, 1923. Serial No. 668,882.

This invention relates to friction clutches for automobile transmissions.

The object of the invention is to provide a clutch of this character which is easy to operate, durable, and which is so constructed as to avoid vibration and noise.

Another object is to provide such a clutch most of the mechanism of which is stationary, only the parts which perform the principal functioning revolve and they operate on ball bearings run in oil.

Another object is to provide such a clutch the contact parts of which will not remain so stationary under strain as to wear flat places as do other friction clutches and which is constructed to eliminate slipping.

Another object is to provide a friction clutch whereby the coupling of the shafts and the desired speed changes and reverse may be effected quickly and reliably without shock to the mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a top plan view of the clutch constructed in accordance with this invention with parts broken out and in section.

Fig. 2 is a transverse section taken on the line 2—2 of Fig. 1.

Fig. 3 is a longitudinal section taken on the line 3—3 of Fig. 1; and

Fig. 4 is a detail plan view of a slightly different form of the invention.

In the embodiment illustrated in Figs. 1 to 3, a driven shaft 1 is shown connected by the clutch constituting this invention to the driving shaft 2 which latter has fixed to its rear end a friction wheel 3 in the rear face of the center of which the front end of shaft 1 is mounted to rotate a ball bearing 3ª being shown at this point.

A similar friction wheel 4 is keyed to slide on shaft 1 and through two disk-like plates 5 and 6 and the wheel 3 connects shafts 1 and 2 so that shaft 1 may be driven by shaft 2 the speed being controlled by the shifting of wheel 4 toward and away from the perimeter of plates 5 and 6. The shifting of wheel 4 is accomplished by means of a lever 7 having a pin and slot connection with wheel 4 and adapted to be adjustably secured by means of a spring pressed dog 8 and a segmental rack 9 such as is usual in devices of this character.

The clutch releasing mechanism is located on opposite sides of the plates 5 and 6 and comprises two disk-like plates 10 and 11 with ball bearings as 13 located between them and plates 5 and 6 as is shown clearly in Fig. 2. These plates 10 and 11 are keyed to slide on hollow shafts 14 and 15 journaled in suitable supports here shown at 16. These hollow shafts or sleeves 14 and 15 have fixed thereto disk-like plates 17 and 18 which are connected with the plates 10 and 11 by means of a plurality of bolts 19 which have threaded engagement with the plates 17 and 18 and are loosely mounted in plates 10 and 11 to permit said plates 10 and 11 to move toward and away from plates 17 and 18. Coiled springs 20 are mounted on the bolts 19 between plates 10 and 17 and 11 and 18 respectively and operate as cushions to hold these plates in yielding operative relation.

Shafts 21 and 22 are fixed at one end to the rear faces of the plates 5 and 6 and extend through the hollow shafts or sleeves 14 and 15 projecting through said sleeves and having mounted thereon coiled springs 23 which are in the form of expansion springs and operate to hold plates 5 and 6 yieldably in engagement with the plates 10 and 11 through ball bearings 13. (See Fig. 2.)

Two screw shafts 24 and 25 are mounted at each side of the clutch having threaded connection at one end with the rear face of plate 10 and loose engagement with plate 17 being journaled in suitable blocks 26 on the supporting frame 27 which is here shown in the form of an automobile chassis. These shafts also have threaded engagement with nuts 28 located in recesses in the blocks 26 and which are designed to control the frictional engagement of disks 5 and 6 with the disks 3 and 4 by adjusting the rods 24 and 25. Arms 29 and 30 are fixed at one end to the shafts 24 and 25 and are connected by a link 31 to adapt them to move in unison. A lever 32 is connected with the outer end of arm 29 while a coiled spring 33 connects arm 30 with a fixed member of the chassis and exerts its tension to normally hold the shafts in the position shown in Fig. 1 whereby the clutch disks 5 and 6 are in engagement with the friction wheels 3 and 4 to connect the driving with the driven shaft.

It is of course to be understood that the clutch releasing mechanism as described is duplicated at the other side of the clutch and that the lever arms 32 are extended and connected at their outer ends with a lever not shown which is positioned for convenient operation by the driver so that the actuation of this lever by the driver will operate to simultaneously turn the screws 24 and 25 at opposite sides of the clutch to move the plates 10 and 11 outwardly against the tension of the springs 20 and thus release the disks 5 and 6 from the friction wheels 3 and 4 and throw the clutch into neutral permitting the driving shaft 2 to rotate without affecting the driven shaft 1.

It is of course understood that when plates 10 and 11 are moved outwardly away from plates 5 and 6 that the coiled springs 23 will operate to move the plates 5 and 6 in the same direction to disengage them from actuating contact with the wheels 3 and 4.

When the clutch is thrown in which occurs on the release of the lever arms 32 which are connected with the lever, not shown, the coiled springs 33 operate to turn the screw shafts 24 and 25 in a direction which causes the plates 10 and 11 to be moved toward each other carrying with them plates 5 and 6 and thus bringing said plates 5 and 6 into frictional contact with the wheels 3 and 4.

The coiled springs 20 and 23 not only perform the functions above described but also operate to avoid vibration of the parts and the consequent noise incident thereto.

In the form shown in Fig. 4 the plates 10$^a$ and 17$^a$ are similar to plates 10 and 17 and are mounted in the same manner on the hollow shaft or sleeve 14 having the coiled springs 20$^a$ arranged between them on the bolts 19$^a$ which connect them.

The plate 10$^a$ has a hub 34 on its rear face from which extends a fixedly connected axle or shaft 35 to the rear end of which is pivotally connected one arm of a bell crank lever 36 fulcrumed at 37 on the vehicle chassis. The other arm of the lever is pivotally connected with an actuating rod 38 which extends forward and which is connected with the actuating lever not shown.

The plates 10$^a$ and 17$^a$ have the same relation to the friction disks 5 and 6 as do the plates 10 and 17 of the other figures and plate 10$^a$ is adapted to be moved rearwardly against the tension of springs 20$^a$ to release the clutch when the bell crank lever 36 is swung so as to exert an outward pull on shaft 35 which occurs by moving rod 38 forward. The shaft 35 extends loosely through the plate 17$^a$ and when the plate 10$^a$ is moved as above set forth the coiled spring 23 will operate to move the friction disk 5 away from the wheels 3 and 4.

It is of course understood that the mechanism shown in Fig. 4 is duplicated at the other side of the clutch the two operating in unison to grip or release the wheels 3 and 4.

From the above description it will be obvious that a clutch constructed as herein shown and described will be easy to operate, durable and noiseless.

After the clutch has been thrown into neutral the speed may be changed by shifting the friction wheel 4 toward or away from the perimeter of disks 5 and 6 which is accomplished by means of the lever 7 above described.

The ball bearings 13 are supplied with oil from grease cups 39.

Various changes in the form, shape, proportion and other minor details of construction may be made without departing from the principle or sacrificing any of the advantages of the claimed invention.

I claim:

In a device of the character described, a driving shaft, a wheel mounted on the shaft, bearings supported laterally of the driving shaft, hollow shafts supported within the bearings, outer and inner disk-like plates mounted on the hollow shafts and secured thereto, coiled springs between the disk-like plates to force the plates apart, shafts extending through the hollow shafts, plates mounted on the last mentioned shafts and disposed adjacent to the outer plates, ball bearings supported between the last mentioned plates and outer disk-like plates, springs mounted on the last mentioned shafts and adapted to exert a pull on the last mentioned shafts to draw the plates together, and said wheels adapted to engage the last mentioned plates to transmit rotary movement thereto.

In testimony that I claim the foregoing as my own, I have hereto affixed my signature.

JOHN KALAF, Jr.